I. P. LIHME.
METHOD OF MANUFACTURING SULFURIC ACID.
APPLICATION FILED JUNE 12, 1913.
1,103,522.
Patented July 14, 1914.
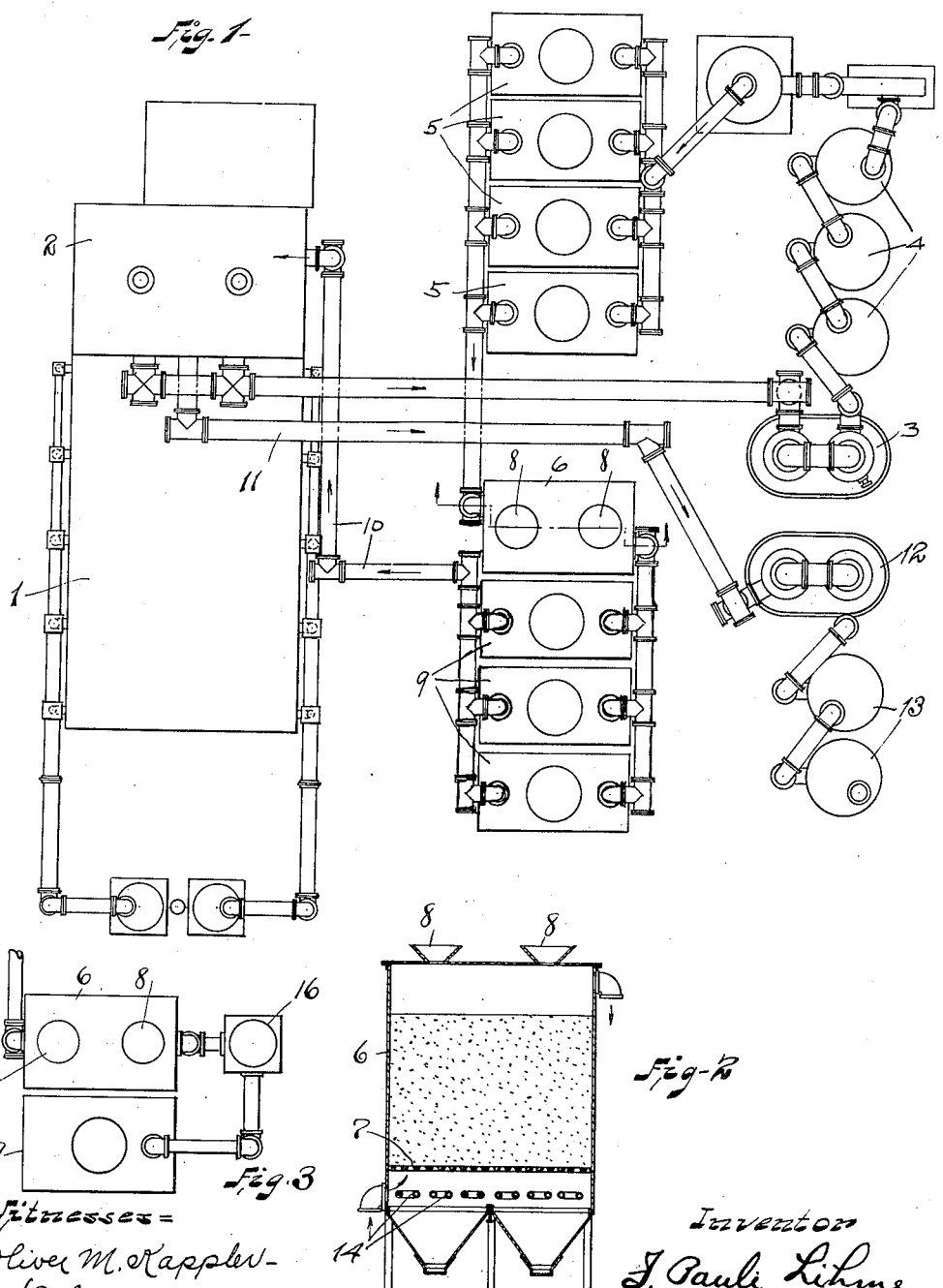

UNITED STATES PATENT OFFICE.

IENS PAULI LIHME, OF LAKEWOOD, OHIO, ASSIGNOR TO THE GRASSELLI CHEMICAL COMPANY, OF CLEVELAND, OHIO, A CORPORATION OF OHIO.

METHOD OF MANUFACTURING SULFURIC ACID.

1,103,522.   Specification of Letters Patent.   Patented July 14, 1914.

Application filed June 12, 1913. Serial No. 773,233.

*To all whom it may concern:*

Be it known that I, IENS PAULI LIHME, a citizen of the United States, and a resident of Lakewood, county of Cuyahoga, and State of Ohio, have invented a new and useful Improvement in Methods of Manufacturing Sulfuric Acid, of which the following is a specification, the principle of the invention being herein explained and the best mode in which I have contemplated applying that principle, so as to distinguish it from other inventions.

The present invention, relating as indicated to the manufacture of sulfuric acid, has more particular regard to the improvement of the so-called contact process of manufacturing sulfuric anhydrid and sulfuric acid. Such contact process involves the converting of sulfur dioxid and oxygen from the air into sulfurtrioxid by means of platinum in a finely divided state, and has been known and used with more or less success for a number of years. The difficulties militating against the successful use of the process are due to impurities in the gases as the latter leave the burners, for if these impurities are not absolutely removed before the gases enter the platinum contact, the catalytic action of the latter will, in a shorter or longer time, entirely stop. The impurities which have to be dealt with are, first, solid matters, such as flue dust and sulfuric acid in the form of spray, carried along with the gases; and, second, much the more difficult to remove, are the impurities that are carried along in a gaseous state, such as arseniureted, seleniureted and phosphureted hydrogen; also chlorids and other hydrogen gases, which are not soluble in sulfuric acid or water. The presence of these impurities in the burner gases has been demonstrated by Winkler, who, in his experiments in regard to contact sulfuric acid, proved that arseniureted hydrogen ($AsH_3$) besides sulfureted hydrogen are present in burner gases, and that both are detrimental to platinum as contact material. Knietsch worked out the contact sulfuric acid process for the Badische Anilin & Soda Fabrik, and he found that notwithstanding that the gases were originally pure, nevertheless the contact material was poisoned with arsenic, which proved that only gaseous arsenic combination which could not be decomposed by sulfuric acid could be considered. These arsenical compound gases have been proven to be $AsH_3$. The presence of $AsH_3$ is explained by the presence of metal, such as iron, in contact with sulfuric acid containing arsenious acid, $As_2O_3$, hydrogen being generated and combining with arsenic to form arseniureted hydrogen.

Various methods have been employed in an attempt to prevent the formation of the arseniureted hydrogen, such as removing all iron, where apt to come in contact with acid containing arsenic, and substituting lead or earthenware, or brick lining, but such methods have not met with any great success. The present method and apparatus have rather been designed with a view to eliminating or removing such arseniureted hydrogen as may be formed, and so bring only gases that are entirely free from this impurity into contact with the platinum.

The steps and details of apparatus for carrying out my improved method will hereinafter be fully described and particularly pointed out in the claims.

The annexed drawing and the following description set forth in detail certain steps and an approved form of mechanism embodying the invention, such disclosed means constituting, however, but one of various ways in which the principle of the invention may be carried out.

In said annexed drawing:—Figure 1 is a plan view of a plant or apparatus for manufacturing sulfuric acid by the contact process embodying my present improvements; Fig. 2 is a transverse section through the part of such apparatus, specifically designed for the removal of the arseniureted hydrogen; and Fig. 3 is a plan view of a detail showing a modification.

For purifying the gases as they come from the burners, as is well known, two methods are in general use, one a wet, and the other a dry method. While my invention may be adopted in the wet process to advantage, it is especially beneficial in connection with the dry method of purifying the gases when ores containing arsenic are burned, and the specific apparatus illustrated in the drawing is designed for use in such dry method of purification. In this process, it is a well known fact that the iron contact shaft does not retain all of the arsenic from the ore, even where the latter is very small in quantity; the consequence is that arsenic trioxid ($As_2O_3$) is carried over into the first absorption tower where, in contact with acid and iron, the arseniureted hydrogen is formed. Even where the gases from such first absorption tower are subsequently passed through drying towers and through dry filters consisting of boxes filled with porous material, such as slag, as is done in certain systems, the arseniureted hydrogen is not removed, since it exists in a gaseous state and so passes on, ultimately reaching the platinum, which it renders inactive. By experiment and investigation, however, I have found that such arseniureted hydrogen and other similar obnoxious gases, such as those previously mentioned, can be removed from the gases by means of iron or copper oxid heated to a temperature not to exceed 100° centigrade, a temperature of 70° to 90° centigrade, being preferred. It is not desirable to employ higher temperatures than those named, since the purification is otherwise incomplete.

Having reference to the drawing, Figure 1 thereof will be seen to illustrate in general, an arrangement of furnace 1, iron contact tower 2, cooler 3, and primary absorption towers 4, such as are in familiar use. After leaving the absorption towers the gases are next conducted through slag filter boxes 5, such as are referred to above as being employed in the known dry processes of purifying the gases. I do not, however, conduct the gases directly from such dry filter boxes to the platinum contact chamber, the latter being included in the tower 2 as usual; but I first pass the same through an iron shaft or tower 6 provided with grate bars 7 adapted to support the iron or copper oxid, which is used as the arsenic-eliminating medium, (see Fig. 2). This tower 6 is arranged with hoppers 8 on top for charging fresh material into the same, as shown in the sectional view of Fig. 2, and it is also provided with steam coils 14, preferably several coils under the grate bars, for heating the contents of the tower to maintain the desired temperature. A certain number of coils (not shown) may also be placed on top of the preceding filter boxes 5, if desired, to insure the gases being at approximately the proper temperature when they reach the iron shaft, my experiments having demonstrated the maintenance of the temperature to be an important item in the successful carrying out of my method of purification. Preferably additional filter boxes 9, similar to filter boxes 5, are installed in the path of the gases after they leave this special iron shaft; the total number of such filter boxes, in other words, should aggregate the number at present in use, this part of the operation being conducted in two stages with my special purification step interposed, as it were. From the last-named set of filter boxes the gases are conducted by a pipe 10 to the platinum contact chamber, thence they are carried by a pipe 11 to the second cooler 12 and the final absorption towers 13, as heretofore.

By the foregoing arrangement I have found, by careful tests under actual operating conditions, that a gas is obtained absolutely free from gaseous arsenic and other obnoxious compounds; as also one absolutely free from any trace of sulfuric acid, which is apt to be carried over as a mist with the gases from the preceding wash tower.

It is to be observed that my process is distinguished from other processes, whereby it has heretofore been attempted to remove arsenic from burner gases used in the manufacture of sulfuric acid, in that such present process recognizes the presence of the arsenic in gaseous form, namely as arseniureted hydrogen. No method or process heretofore devised, as far as I am aware, is capable of achieving the result which I have accomplished.

The reaction that occurs in the tower 6, I have found results in the production of a certain amount of water owing to the combination of some of the hydrogen from the arseniureted hydrogen with oxygen from the oxide. In case the quantity of water is sufficient to render its removal desirable, a lead tower 16 (Fig. 3) may be interposed between said tower 6 and the next adjacent filter box 9. The tower 16 will be filled with coke or like material and sulfuric acid be allowed to trickle down thereover so as to absorb all moisture in the gases leaving the purification step.

Other modes of applying the principle of my invention may be employed instead of the one explained, change being made as regards the steps or mechanism herein disclosed, provided the means stated by any of the following claims or the equivalent of such stated means be employed.

I therefore particularly point out and distinctly claim as my invention:—

1. In a method of manufacturing sulfuric anhydrid and acid, the step which consists in passing the burner gases, at a temperature not to exceed 100° centigrade, in contact with a metallic oxid capable of absorbing hydrogen compounds of arsenic and the like, substantially as described.

2. In a method of manufacturing sulfuric anhydrid and acid, the step which consists in passing the burner gases, at a temperature between 70° and 90° centigrade, in contact with a metallic oxid capable of absorbing arseniureted hydrogen, substantially as described.

3. In a method of manufacturing sulfuric anhydrid and acid, the step which consists in passing the burner gases, at a temperature between 70° and 90° centigrade, in contact with iron oxid.

4. In a method of manufacturing sulfuric anhydrid and acid, the steps which consist in filtering the sulfurous burner gases at a temperature not exceeding 100° centigrade; passing such gases in contact with a metallic oxid capable of absorbing hydrogen compounds of arsenic and the like; further filtering such gases; and then subjecting the same to the catalytic action of platinum.

5. In a method of manufacturing sulfuric anhydrid and acid, the steps which consist in filtering the sulfurous burner gases; passing such gases, at a temperature between 70° and 90° centigrade, in contact with a metallic oxid capable of absorbing arseniureted hydrogen; further filtering such gases; and then subjecting the same to the catalytic action of platinum.

Signed by me, this 10th day of June, 1913.

I. PAULI LIHME.

Attested by—
   JNO. F. OBERLIN,
   W. R. GRIBBEN.